US012739674B2

(12) United States Patent
Ng et al.

(10) Patent No.: US 12,739,674 B2
(45) Date of Patent: Sep. 15, 2026

(54) TEST METHODOLOGY FOR INTEGRATED ACCESS AND BACKHAUL

(71) Applicant: Nokia Technologies Oy, Espoo (FI)

(72) Inventors: Man Hung Ng, Swindon (GB); Bartlomiej Golebiowski, Wroclaw (PL); Tomasz Wojciechowski, Wroclaw (PL)

(73) Assignee: Nokia Technologies Oy, Espoo (FI)

( * ) Notice: Subject to any disclaimer, the term of this patent is extended or adjusted under 35 U.S.C. 154(b) by 344 days.

(21) Appl. No.: 18/552,771

(22) PCT Filed: Mar. 17, 2022

(86) PCT No.: PCT/EP2022/056985
§ 371 (c)(1),
(2) Date: Sep. 27, 2023

(87) PCT Pub. No.: WO2022/207342
PCT Pub. Date: Oct. 6, 2022

(65) Prior Publication Data
US 2024/0073723 A1 Feb. 29, 2024

(30) Foreign Application Priority Data
Apr. 1, 2021 (FI) ..................................... 20215407

(51) Int. Cl.
*H04W 24/08* (2009.01)
*H04W 84/04* (2009.01)
(Continued)

(52) U.S. Cl.
CPC ......... *H04W 24/08* (2013.01); *H04W 84/047* (2013.01); *H04L 43/50* (2013.01); *H04W 88/04* (2013.01)

(58) Field of Classification Search
CPC ... H04W 84/047; H04W 24/02; H04W 76/12; H04W 92/20; H04W 24/04; H04W 24/08;
(Continued)

(56) References Cited

U.S. PATENT DOCUMENTS

2019/0334632 A1 10/2019 Ng
2020/0351198 A1 11/2020 Majmundar et al.
2021/0377902 A1* 12/2021 Merkel ................ H04L 41/044

FOREIGN PATENT DOCUMENTS

CN 108028744 A 5/2018
EP 3131226 A1 2/2017
(Continued)

OTHER PUBLICATIONS

Office action received for corresponding Japanese Patent Application No. 2023-560461, dated Nov. 26, 2024, 4 pages of office action and 3 pages of summary available.
(Continued)

*Primary Examiner* — Nam T Huynh
(74) *Attorney, Agent, or Firm* — McCarter & English, LLP

(57) ABSTRACT

The present subject matter relates to a method for operating a node of a communication system. The node is configured to support wireless backhauling in the communication system and support wireless access to user equipments of the communication system. The method comprises: using at least one test configuration for concurrently testing data transmission on a backhaul link and an access link of the node.

19 Claims, 4 Drawing Sheets

(51) Int. Cl.
*H04L 43/50* (2022.01)
*H04W 88/04* (2009.01)

(58) Field of Classification Search
CPC ...... H04W 92/14; H04W 88/04; H04L 43/50; H04B 7/155
See application file for complete search history.

(56) References Cited

FOREIGN PATENT DOCUMENTS

| | | | |
|---|---|---|---|
| EP | 3261272 | A1 | 12/2017 |
| JP | 2013081052 | A | 5/2013 |
| JP | 2019520757 | A | 7/2019 |
| WO | 2022/207342 | A1 | 10/2022 |

OTHER PUBLICATIONS

"TP example for Conducted receiver characteristic test", 3GPP TSG-RAN WG4 Meeting # 98-e, R4-2102328, Agenda: 7.4.3.3.2, Ericsson, Jan. 25-Feb. 5, 2021, 6 pages.
"Discussion on IAB test model", 3GPP TSG RAN WG4 Meeting #98-e, R4-2101961, Agenda: 7.4.3.2.2, ZTE Corporation, Jan. 25-Feb. 5, 2021, 10 pages.
"Email discussion summary for [98e][306] NR_IAB_Conformance_Part1", 3GPP TSG-RAN WG4 Meeting # 98-e, R4-2103930, Agenda: 7.4.3.1, Nokia, Jan. 25-Feb. 5, 2021, 36 pages.
"WF on test configurations, models and Rx FRC", 3GPP TSG-RAN WG4 Meeting # 98-e, R4-2103854, Agenda: 7.4.3.1, Nokia, Jan. 25-Feb. 5, 2021, 3 pages.
Office action received for corresponding Finnish Patent Application No. 20215407, dated Nov. 19, 2021, 8 pages.
Polese et al., "Integrated Access and Backhaul in 5G mmWave Networks: Potential and Challenges", IEEE Communications Magazine, vol. 58, No. 3, Mar. 2020, pp. 62-68.
"IAB RF conformance testing burden considerations", 3GPP TSG-RAN WG4 Meeting #98e, R4-2102014, Agenda: 7.4.3.4.3, Nokia, Jan. 25-Feb. 5, 2021, 6 pages.
"3rd Generation Partnership Project; Technical Specification Group Radio Access Network; NR; Integrated access and backhaul radio transmission and reception (Release 16)", 3GPP TS 38.174, V16.1.0, Dec. 2020, pp. 1-126.
"3rd Generation Partnership Project; Technical Specification Group Radio Access Network; NR; Integrated access and backhaul (IAB) conformance testing Part 1: Conducted conformance testing (Release 16)", 3GPP TS 38.176-1, V16.1.0, Sep. 2021, pp. 1-215.
"3rd Generation Partnership Project; Technical Specification Group Radio Access Network; NR; Integrated Access and Backhaul (IAB) conformance testing; Part 2: Radiated conformance testing; (Release 16)", 3GPP TS 38.176-2, V16.1.0, Sep. 2021, pp. 1-319.
"Further considerations on IAB test configurations with TP to 38.176-1 and 38.176-2", 3GPP TSG-RAN WG4 Meeting # 98-bis-e, R4-2106321, Agenda: 5.3.2.2.1, Nokia, Apr. 12-20, 2021, 11 pages.
"Discussion on IAB test configurations with TPs to 38.176-1 and 38.176-2", 3GPP TSG-RAN WG4 Meeting # 99-e, R4-2110140, Agenda: 6.3.2.2.1, Nokia, May 19-27, 2021, 11 pages.
"Further considerations on TDD pattern for IAB test models", 3GPP TSG-RAN WG4 Meeting # 98-bis-e, R4-2106322, Agenda: 5.3.2.2.2, Nokia, Apr. 12-20, 2021, 4 pages.
"WF on single RB High PSD", 3GPP TSG-RAN WG4 Meeting # 99, R4-2108563, Agenda: 6.3.2.1, Nokia, May 19-27, 2021, 3 pages.
"WF on Test configuration", 3GPP TSG-RAN WG4 Meeting # 98-bis-e, R4-2106045, Agenda: 5.3.2.1, Nokia, Apr. 12-20, 2021, 2 pages.
"Proposal on single RB with high PSD test model for IAB", 3GPP TSG-RAN WG4 Meeting # 100-e, R4-2112266, Agenda: 6.1.2.2.1, Nokia, Aug. 16-27, 2021, 4 pages.
"TDD pattern for IAB test models", 3GPP TSG-RAN WG4 Meeting # 99-e, R4-2110139, Agenda: 6.3.2.2.2, Nokia, May 19-27, 2021, 3 pages.
Office action received for corresponding Finnish Patent Application No. 20215407, dated Jun. 13, 2022, 7 pages.
International Search Report and Written Opinion received for corresponding Patent Cooperation Treaty Application No. PCT/EP2022/056985, dated Jul. 26, 2022, 18 pages.
"WF on TAB EMC core requirements", 3GPP TSG-RAN WG4 Meeting #94-e, R4-2002348, ZTE, Feb. 24-Mar. 6, 2020, 5 pages.
"On the performance of IAB solutions", 3GPP TSG RAN WG1 Meeting #93, R1-1806907, Agenda: 7.7.3, Huawei, May 21-25, 2018, 6 pages.
"Further discussion on IAB EMC radiated immunity requirement", 3GPP TSG-RAN WG4 Meeting # 95-e, R4-2007539, ZTE, May 25-Jun. 5, 2020, 3 pages.
"Performance of simultaneous operation of IAB-node's child and parent links", 3GPP TSG RAN WG1 #103-e, R1-2008314, AT&T, Oct. 26-Nov. 13, 2020, 6 pages.
"Evaluation methodology and results on NR IAB", 3GPP TSG RAN WG1 #95, R1-1812487, Agenda: 7.2.3.2, Intel Corporation, Nov. 12-16, 2018, 7 pages.
Office action received for corresponding Indian Patent Application No. 202347073896, dated Mar. 26, 2025, 5 pages.

* cited by examiner

| Field name | Value | | |
|---|---|---|---|
| referenceSubcarrierSpacing (kHz) | 15 | 30 | 60 |
| Periodicity (ms) for dl-UL-TransmissionPeriodicity | 5 | 5 | 5 |
| nrofDownlinkSlots | 2 | 5 | 9 |
| nrofDownlinkSymbols | 6 | 5 | 10 |
| nrofUplinkSlots | 2 | 4 | 9 |
| nrofUplinkSymbols | 6 | 5 | 10 |

| Field name | Value | |
|---|---|---|
| referenceSubcarrierSpacing (kHz) | 60 | 120 |
| Periodicity (ms) for dl-UL-TransmissionPeriodicity | 1.25 | 1.25 |
| nrofDownlinkSlots | 2 | 5 |
| nrofDownlinkSymbols | 6 | 5 |
| nrofUplinkSlots | 2 | 4 |
| nrofUplinkSymbols | 6 | 5 |

Fig. 6

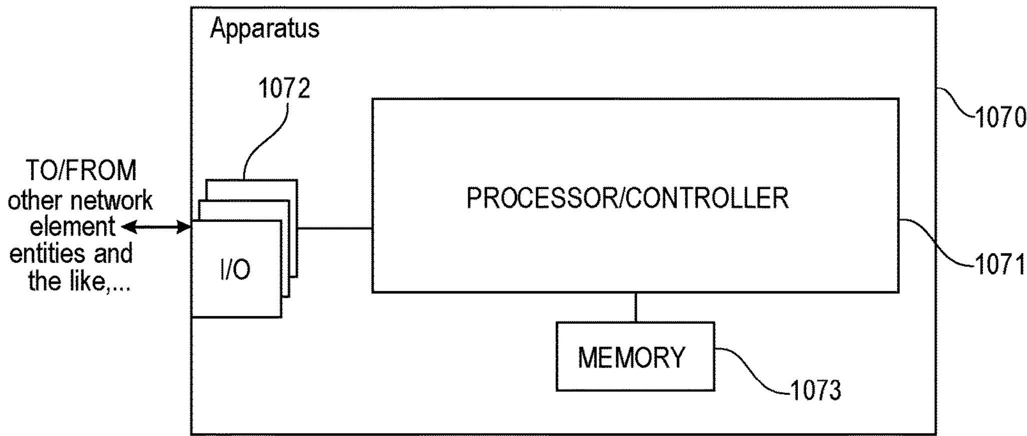

Fig. 7

TEST METHODOLOGY FOR INTEGRATED ACCESS AND BACKHAUL

RELATED APPLICATION

This application was originally filed as PCT Application No. PCT/EP2022/056985 on 17 Mar. 2022, which claims priority from FI Application No. 20215407, filed on 1 Apr. 2021, each of which is incorporated herein by reference in its entirety.

TECHNICAL FIELD

Various example embodiments relate to telecommunication systems, and more particularly to a test methodology for integrated access and backhaul nodes.

BACKGROUND 5G refers to a new generation of radio systems and network architecture. 5G is expected to provide higher bitrates and coverage than the current long term evolution (LTE) systems. Integrated access and backhaul (IAB) is one of the key work items for 5G. However, there is a need to improve the operation of IAB nodes.

SUMMARY

Example embodiments provide a method for operating a node of a communication system, the node being configured to support wireless backhauling in the communication system and support wireless access to user equipments of the communication system, the method comprising: using at least one test configuration for concurrently testing data transmission on a backhaul link and an access link of the node.

Example embodiments provide method for operating an IAB node, the method comprising: using at least one test configuration for concurrently testing data transmission on a backhaul link and an access link of the IAB node.

Example embodiments provide method for operating an IAB node, the method comprising: using at least one test configuration for concurrently testing a backhaul functionality and an access functionality of the IAB node.

Example embodiments provide method for operating an IAB node, the method comprising: using at least one test configuration for concurrently testing a functionality of a distribution unit (DU) of the IAB node and a functionality of a mobile termination (MT) of the IAB node.

Example embodiments provide a computer program comprising instructions for causing an integrated access and backhaul (IAB) node for performing at least the following: using at least one test configuration for concurrently testing data transmission on a backhaul link and an access link of the IAB node.

Example embodiments provide a node being configured for using at least one test configuration for concurrently testing data transmission on a backhaul link and an access link of the node. The node may, for example, be a IAB node of 5G.

Note that the words “first” and “second” are used here and elsewhere for labelling purposes only and are not intended to denote any specific spatial or temporal ordering. Furthermore, the labelling of a “first” element does not imply the presence a “second” element.

BRIEF DESCRIPTION OF THE DRAWINGS

The accompanying figures are included to provide a further understanding of examples, and are incorporated in and constitute part of this specification. In the figures:

FIG. 6 are tables showing time slot configurations in accordance with an example of the present subject matter;

FIG. 7 is a block diagram showing an example of an apparatus according to an example of the present subject matter.

DETAILED DESCRIPTION

Figure 1:
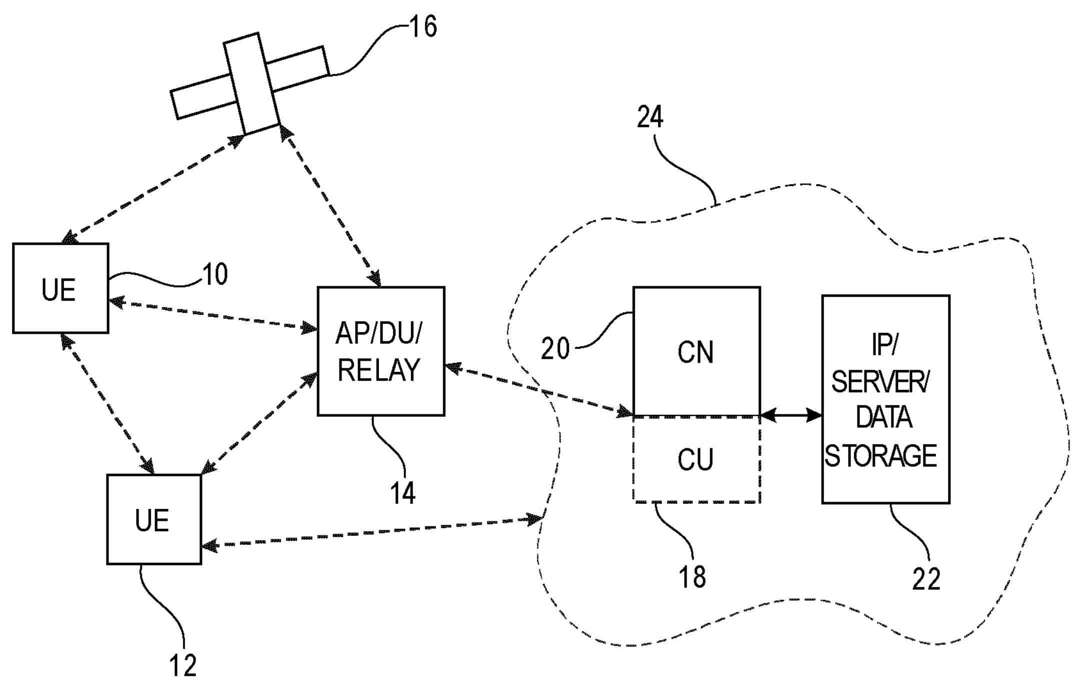
FIG. 1 illustrates a part of an exemplifying radio access network.

In the following description, for purposes of explanation and not limitation, specific details are set forth such as particular architectures, interfaces, techniques, etc., in order to provide a thorough understanding of the examples. However, it will be apparent to those skilled in the art that the disclosed subject matter may be practiced in other illustrative examples that depart from these specific details. In some instances, detailed descriptions of well-known devices and/or methods are omitted so as not to obscure the description with unnecessary detail.

The term “node” as used herein may refer to a base station. The communication system may, for example, be configured to use a time division duplex (TDD) technique for data transmission. The communication system may support on or more radio access technologies (RATs). A radio access technology of the radio access technologies may, for example, be evolved universal terrestrial radio access (E-UTRA) or 5G new radio (NR), but it is not limited to, as a person skilled in the art may apply the present subject matter to other communication systems provided with necessary properties.

The communication system comprises IAB donors and IAB nodes. An IAB donor may be defined as a node with a wired backhaul link, which provides the user equipment’s interface to a core network of the communication system as well as a wireless backhauling functionality to IAB nodes. The IAB donor may, for example, be equipped with a centralized unit (CU) as well as a distributed unit (DU). The IAB node may be a node that supports wireless access to user equipments and wirelessly backhauls the access traffic. The IAB node is equipped with a distributed unit (DU) and a mobile termination (MT) unit. The DU and MT of the IAB node may be referred to as IAB-DU and IAB-MT respectively. The IAB node may provide a backhauling functionality and an access functionality using the IAB-DU and IAB-MT. The IAB node may operate as a parent node, when its IAB-DU is connected to other IAB nodes’ MTs, and as a child node when its IAB-MT is connected to another IAB node’s DU. The IAB-DU of a given IAB-node may be configured to exchange data over an access link with user equipments and the IAB-MT of the given IAB node may be configured to exchange data over a backhaul link with a DU of a IAB donor or with the IAB-DU of another IAB node.

However, one of the main problems for operating the IAB nodes may be the definition of the test methodology to be used in the conformance testing for IAB nodes. The conformance testing may be a very time consuming process, especially due to the extremely wide frequency ranges to be tested for the spurious emission and out-of-band blocking requirements. For example, if the conformance testing for IAB-DU and IAB-MT is performed separately, the required testing time may be double. The present subject matter may reduce the required testing time using a IAB test methodology which is specified in a way that the conformance testing for the IAB-DU and IAB-MT can be performed concurrently or simultaneously. The concurrent transmission on the backhaul link and access link may, for example, be performed in same time slots or different time slots of a predefined testing time period.

For that, the present subject matter may provide a method (named hereinafter testing method) for operating a IAB node. The testing method comprises using at least one test configuration for concurrently testing data transmission on a backhaul link and an access link of the IAB node.

The backhaul link may refer, for example, to a communication link for transmitting data and/or receiving data between an IAB node and another IAB node or an IAB donor node. The access link may, for example, refer to a communication link for transmitting and/or receiving data between an IAB node and a user equipment or another IAB node.

By transmitting the data on the backhaul link and the access link, the backhauling functionality and access functionality of the IAB node may be tested respectively. This may enable to simultaneously test the functionality of the IAB-DU and IAB-MT of the IAB node. For example, the conformance testing for the IAB-DU and IAB-MT of the IAB node may be performed concurrently.

In one example, the at least one test configuration (TC) comprises one test configuration. That is, the testing method uses the same test configuration for concurrently testing the data transmission on the backhaul link and the access link of the IAB node. In another example, the at least one test configuration comprises two or more test configurations.

In one example, testing the data transmission on the backhaul link and on the access link of the IAB node comprises performing the data transmission on the backhaul link and on the access link of the IAB node. Concurrently testing the data transmission on the backhaul link and on the access link of the IAB node comprises concurrently performing the data transmission on the backhaul link and on the access link of the IAB node. Testing the data transmission may, in another example, further comprise performing at least one measurement and determining whether results of the at least one measurement fulfill a predefined test requirement. The measurements may, for example, include measurement of the throughput, measurement of the output power or other types of measurements that can be used for testing the IAB node. The test requirement may, for example, require the throughput to be higher than x % e.g., 90% etc. For example, the testing method may be performed for the IAB node having a given hardware and/or software configuration. This configuration may enable to perform one or more types of measurements and tests using the transmissions performed on the backhaul link and the access link. The configuration of the IAB node may, for example, be changed and the testing method executed again with the IAB node having the changed configuration for performing different types of measurements and tests.

The test configuration may, for example, be a carrier or frequency configuration that may be used to allocate frequency resources to perform the concurrent data transmission on the backhaul link and the access link. For that, the at least one test configuration may, for example, define at least one first frequency range for the backhaul functionality testing and may define at least one second frequency range for the access functionality testing. The first frequency range may for, example, cover/comprise one or more physical resource blocks (PRBs), the first frequency range may thus be referred to as "UL PRB" as it is associated with the backhaul link (e.g., used for UL transmission by the node). The second frequency range may for, example, cover one or more PRBs, the second frequency range may thus be referred to as "DL PRB" as it is associated with the access link (e.g., used for DL transmission by the node). The first frequency range may be placed within a channel bandwidth which may be named IAB-MT channel bandwidth. The second frequency range may be placed within a channel bandwidth which may be named IAB-DU channel bandwidth.

In one example, testing the data transmission on the backhaul link and on the access link of the IAB node comprises concurrently or simultaneously transmitting data on the backhaul link using at least one first frequency range and transmitting data on the access link using at least one second frequency range. The transmission may, for example, be performed in Time Division Multiplexing (TDM) mode of transmission, Frequency Division Multiplexing (FDM) mode of transmission or in Spatial Division Multiplexing (SDM) mode of transmission.

In one first example test configuration, the at least one first frequency range comprises two first frequency ranges (e.g., named $$R_F^1 \text{ and } R_F^2)$$

and the at least one second frequency range comprises two second frequency ranges (e.g., named $$R_F^3 \text{ and } R_F^4)$$

that correspond to the two first frequency ranges $$R_F^1 \text{ and } R_F^2$$

respectively. According to the first example test configuration, the two first frequency ranges $$R_F^1 \text{ and } R_F^2$$

are subranges of the two second frequency ranges $$R_F^3 \text{ and } R_F^4$$

respectively. Additionally, the two first frequency ranges $R_F^1$ and $R_F^2$ may be placed at the upper and lower edges respectively of the radio frequency (RF) bandwidth of the IAB node. That is, the two second frequency ranges $R_F^3$ and $R_F^4$ may also be placed at the upper and lower edges respectively of the RF bandwidth of the IAB node.

In one second example test configuration, the at least one first frequency range comprises one first frequency range (e.g., named $R_F^1$)

and the at least one second frequency range comprises two second frequency ranges (e.g., named $R_F^3$ and $R_F^4$)

, wherein the second frequency range $R_F^3$ corresponds to the first frequency range $R_F^1$.

According to the second example test configuration, the first frequency range $R_F^1$ is a subrange of the second frequency range $R_F^3$.

Additionally, the first frequency range $R_F^1$ may be placed at one edge of the RF bandwidth of the IAB node. The two second frequency ranges $R_F^3$ and $R_F^4$ may be placed at the upper and lower edges respectively of the RF bandwidth of the IAB node.

In one third example test configuration, the at least one first frequency range comprises one first frequency range (e.g., named $R_F^1$)

and the at least one second frequency range comprises one second frequency range (e.g., named $R_F^3$)

corresponding to the first frequency ranges $R_F^1$.

According to the third example test configuration, the first frequency range $R_F^1$ is a subrange of the second frequency range $R_F^3$.

Additionally, the first frequency range $R_F^1$ may be placed at one edge of the RF bandwidth of the IAB node. The second frequency range $R_F^3$ may be placed at the same one edge of the RF bandwidth of the IAB node.

In one fourth example test configuration, the at least one first frequency range comprises three first frequency ranges (e.g., named $R_F^1$, $R_F^2$ and $R_F^3$)

and the at least one second frequency range comprises three second frequency ranges (e.g., named $R_F^4$, $R_F^5$ and $R_F^6$)

that correspond to the three first frequency ranges $R_F^1$, $R_F^2$ and $R_F^3$ respectively. According to the fourth example test configuration, the three first frequency ranges $R_F^1$, $R_F^2$ and $R_F^3$ are subranges of the three second frequency ranges $R_F^4$, $R_F^5$ and $R_F^6$ respectively. Additionally, the two first frequency ranges $R_F^1$ and $R_F^2$ may be placed at the upper and lower edges respectively of the RF bandwidth of the IAB node and the third first frequency ranges $R_F^3$ may be placed in the middle of the RF bandwidth of the IAB node. That is, the three second frequency ranges $R_F^4$, $R_F^5$ and $R_F^6$ may also be placed at the upper and lower edges, and the middle of the RF bandwidth of the IAB node respectively.

In one fifth example test configuration, the at least one first frequency range comprises two first frequency ranges (e.g., named $R_F^1$ and $R_F^2$)

and the at least one second frequency range comprises two second frequency ranges (e.g., named $R_F^3$ and $R_F^4$)

that correspond to the two first frequency ranges $R_F^1$ and $R_F^2$ respectively. According to the fifth example test configuration, the two first frequency ranges $R_F^1$ and $R_F^2$ are separated from the two second frequency ranges $R_F^3$ and $R_F^4$ respectively by a predefined frequency offset. Additionally, the two first frequency ranges $R_F^1$ and $R_F^2$ may be placed at the upper and lower edges respectively of the RF bandwidth of the IAB node.

In one sixth example test configuration, the at least one first frequency range comprises one first frequency range (e.g., named $R_F^1$)

and the at least one second frequency range comprises two second frequency ranges (e.g., named $R_F^3$ and $R_F^4$)

wherein the second frequency range $R_F^3$ corresponds to the first frequency range $R_F^1$.

According to the sixth example test configuration, the first frequency range $R_F^1$ is separated from the second frequency ranges $R_F^3$ by a predefined frequency offset. Additionally, the first frequency range $R_F^1$ may be placed at one edge of the RF bandwidth of the IAB node.

In one seventh example test configuration, the at least one first frequency range comprises one first frequency range (e.g., named $R_F^1$)

and the at least one second frequency range comprises one second frequency range (e.g., named $R_F^3$)

corresponding to the first frequency range $R_F^1$.

According to the seventh example test configuration, the first frequency range $R_F^1$ is separated from the second frequency ranges $R_F^3$ by a predefined frequency offset. Additionally, the first frequency range $R_F^1$ may be placed at one edge of the RF bandwidth of the IAB node.

In one further example test configuration, each of the at least one first frequency range is equal to a respective second frequency range of the at least one second frequency range.

The IAB node may comprise a multi-antenna system. The multi-antenna system may comprise one or more arrays of antenna elements. The array may be a collection of multiple antenna elements arranged in a matrix of rows and columns or some other pattern. The multi-antenna system may be used to perform the beamforming. The beamforming may be a signal processing technique that may be used at the IAB node to add together radiation patterns of each of the antenna elements in an array in such a way that they concentrate the energy into a narrow beam or lobe. Beamforming may be achieved by combining the signals communicated via antenna elements of an antenna array such that some of the signals experience constructive interference while others experience destructive interference. To create the desired constructive/destructive interference, the IAB node may apply amplitude and/or phase offsets to signals transmitted from each of the antenna elements of the antenna array. The IAB node may thus be configured according to the present subject matter to use the beamforming technique to generate a set of one or more beams for the data to be transmitted in the set of beams.

Hence, according to one example, the data transmission on the backhaul link and the data transmission on the access link may be performed on the same time slots using beams having respective different beam directions in a spatial domain of the communication system. The beam directions of the data transmission on the backhaul link and the data transmission on the access link may be configured or defined as close as possible, by for example, requiring that the difference (e.g., angle difference) between the beam directions does not exceed a maximum difference. Indeed, it is expected that when the DL and UL transmission for IAB-DU and IAB-MT is done in SDM mode (i.e., using different directional beams), pointing the directional beams closer to each other may represent a more demanding TC as they could start interfering with each other. This example enables to point the DL and UL directional beams as close as possible within the DL and UL beam direction ranges supported by the IAB-DU and IAB-MT when the DL and UL transmission for IAB-DU and IAB-MT is done in SDM mode.

As regard the time domain of the data transmission, the present subject matter may provide an efficient sharing of time slots for enabling concurrent or simultaneous data transmissions on the backhaul link and the access link of the IAB node.

In one example, the data transmission on the backhaul link is performed in first time slots and the data transmission on the access link is performed in second time slots, wherein the first time slots and second time slots are different. For example, the sharing of time slots may be performed such that the difference between the number of the first time slots and the number of the second time slots is smaller than a threshold. In another example, the sharing of time slots may be performed such that a ratio of the number of the first time slots by the number of the second time slots is equal to one or substantially equal to one.

The first time slots may further be used for data reception on the access link, and the second time slots may further be used for data reception on the backhaul link. The first time slots may be referred to as uplink (UL) slots and the second time slots may be referred to as downlink (DL) slots, wherein the uplink slots and downlink slots are defined in accordance with a DL-UL pattern having a predefined periodicity. The periodicity of the DL-UL pattern may for example be defined in a float/integer number of milliseconds. The periodicity of the DL-UL pattern may, for example, be a value of the information element dl-UL-TransmissionPeriodicity. The first and second time slots may, for example, be defined as described with the table of FIG. 6.

FIG. 1 depicts example of simplified system architecture showing some elements and functional entities, all being logical units, whose implementation may differ from what is shown. The connections shown in FIG. 1 are logical connections; the actual physical connections may be different. It is apparent to a person skilled in the art that the system typically comprises also other functions and structures than those shown in FIG. 1.

The embodiments are not, however, restricted to the system given as an example but a person skilled in the art may apply the solution to other communication systems provided with necessary properties.

The example of FIG. 1 shows a part of an exemplifying radio access network. FIG. 1 shows devices 10 and 12. The devices 10 and 12 may, for example, be user devices. The devices 10 and 12 are configured to be in a wireless connection on one or more communication channels with a node 14. The node 14 is further connected to a core network 20. In one example, the node 14 may be an access node (such as (e/g)NodeB) 14 providing or serving devices in a cell. In one example, the node 14 may be a non-3GPP access node. The physical link from a device to a (e/g)NodeB is called uplink or reverse link and the physical link from the (e/g) NodeB to the device is called downlink or forward link. It should be appreciated that (e/g)NodeBs or their functionalities may be implemented by using any node, host, server or access point etc. entity suitable for such a usage. The node 14 may, in one example, be a IAB node comprising an IAB-DU and IAB-MT.

A communications system typically comprises more than one (e/g)NodeB in which case the (e/g)NodeBs may also be configured to communicate with one another over links, wired or wireless, designed for the purpose. These links may be used for signaling purposes. The (e/g)NodeB is a computing device configured to control the radio resources of communication system it is coupled to. The NodeB may also be referred to as a base station, an access point or any other type of interfacing device including a relay station capable of operating in a wireless environment. The (e/g)NodeB includes or is coupled to transceivers. From the transceivers of the (e/g)NodeB, a connection is provided to an antenna unit that establishes bi-directional radio links to devices. The antenna unit may comprise a plurality of antennas or antenna elements. The (e/g)NodeB is further connected to the core network 20 (CN or next generation core NGC). For example, the (e/g)NodeB may connect to an access and mobility management function (AMF) and user plane function (UPF) in the control plane and user plane, respectively. Depending on the system, the counterpart on the CN side can be a serving gateway (S-GW, routing and forwarding user data packets), packet data network gateway (P-GW), for providing connectivity of devices (UEs) to external packet data networks, or mobile management entity (MME), etc.

The device (also called user device, UE, user equipment, user terminal, terminal device, etc.) illustrates one type of an apparatus to which resources on the air interface are allocated and assigned, and thus any feature described herein with a device may be implemented with a corresponding apparatus, such as a relay node. An example of such a relay node is a layer 3 relay (self-backhauling relay) towards the base station.

The device typically refers to a device (e.g. a portable or non-portable computing device) that includes wireless mobile communication devices operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a device may also be a nearly exclusive uplink only device, of which an example is a camera or video camera loading images or video clips to a network. A device may also be a device having capability to operate in Internet of Things (IoT) network which is a scenario in which objects are provided with the ability to transfer data over a network without requiring human-to-human or human-to-computer interaction, e.g. to be used in smart power grids and connected vehicles. The device may also utilize cloud. In some applications, a device may comprise a user portable device with radio parts (such as a watch, earphones or eyeglasses) and the computation is carried out in the cloud. The device (or in some embodiments a layer 3 relay node) is configured to perform one or more of user equipment functionalities. The device may also be called a subscriber unit, mobile station, remote terminal, access terminal, user terminal or user equipment (UE) just to mention but a few names or apparatuses.

Various techniques described herein may also be applied to a cyber-physical system (CPS) (a system of collaborating computational elements controlling physical entities). CPS may enable the implementation and exploitation of massive amounts of interconnected ICT devices (sensors, actuators, processors microcontrollers, etc.) embedded in physical objects at different locations. Mobile cyber physical systems, in which the physical system in question has inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not all shown in FIG. 1) may be implemented.

5G enables using multiple input-multiple output (MIMO) antennas, many more base stations or nodes than an existing LTE system (a so-called small cell concept), including macro sites operating in co-operation with smaller stations and employing a variety of radio technologies depending on service needs, use cases and/or spectrum available. 5G mobile communications supports a wide range of use cases and related applications including video streaming, augmented reality, different ways of data sharing and various forms of machine type applications (such as (massive) machine-type communications (mMTC), including vehicular safety, different sensors and real-time control. 5G is expected to have multiple radio interfaces, namely below 6 GHz, cmWave and mmWave, and also being integrable with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz-cmWave, below 6 GHz-cmWave-mmWave). One of the concepts considered to be used in 5G networks is network slicing in which multiple independent and dedicated virtual sub-networks (network instances) may be created within the same infrastructure to run services that have different requirements on latency, reliability, throughput and mobility.

The current architecture in LTE networks is fully distributed in the radio and fully centralized in the core network. The low latency applications and services in 5G require to bring the content close to the radio which leads to local break out and multi-access edge computing (MEC). 5G enables analytics and knowledge generation to occur at the source of the data. This approach requires leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system is also able to communicate with other networks, such as a public switched telephone network or the Internet as illustrated by the component referenced by reference numeral 22, or utilize services provided by them. The communication network may also be able to support the usage of cloud services, for example at least part of core network operations may be carried out as a cloud service (this is depicted in FIG. 1 by "cloud" 24). The communication system may also comprise a central control entity, or a like, providing facilities for networks of different operators to cooperate for example in spectrum sharing.

The technology of Edge cloud may be brought into a radio access network (RAN) by utilizing network function virtualization (NVF) and software defined networking (SDN). Using the technology of edge cloud may mean access node operations to be carried out, at least partly, in a server, host or node operationally coupled to a remote radio head or base station comprising radio parts. It is also possible that node operations will be distributed among a plurality of servers, nodes or hosts. Application of cloudRAN architecture enables RAN real time functions being carried out at the RAN side (in a distributed unit, DU 14) and non-real time functions being carried out in a centralized manner (in a centralized unit, CU 18).

It should also be understood that the distribution of labour between core network operations and base station operations may differ from that of the LTE or even be non-existent. Some other technology advancements probably to be used are Big Data and all-IP, which may change the way networks are being constructed and managed. 5G is being designed to support multiple hierarchies, where MEC servers can be placed between the core and the base station or nodeB (gNB). It should be appreciated that MEC can be applied in 4G networks as well.

5G may also utilize satellite communication to enhance or complement the coverage of 5G service, for example by providing backhauling. Possible use cases are providing service continuity for machine-to-machine (M2M) or Internet of Things (IoT) devices or for passengers on board of vehicles, or ensuring service availability for critical communications, and future railway/maritime/aeronautical communications. Satellite communication may utilize geostationary earth orbit (GEO) satellite systems, but also low earth orbit (LEO) satellite systems, in particular mega-constellations (systems in which hundreds of (nano)satellites are deployed). Each satellite 16 in the mega-constellation may cover several satellite-enabled network entities that create on-ground cells. The on-ground cells may be created via an on-ground relay node 14 or by a gNB located on-ground or in a satellite.

It is understandable for a person skilled in the art that the depicted system is only an example of a part of a radio access system and in practice, the system may comprise a plurality of (e/g)NodeBs, the device may have an access to a plurality of radio cells and the system may comprise also other apparatuses, such as physical layer relay nodes or other network elements, etc. One of the (e/g)NodeBs or may be a Home(e/g)nodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometers, or smaller cells such as micro-, femto- or picocells. The (e/g)NodeBs of FIG. 1 may provide any kind of these cells. A cellular radio system may be implemented as a multilayer network including several kinds of cells. Typically, in multilayer networks, one access node provides one kind of a cell or cells, and thus a plurality of (e/g) NodeBs are required to provide such a network structure.

For fulfilling the need for improving the deployment and performance of communication systems, the concept of "plug-and-play" (e/g)NodeBs has been introduced. Typically, a network which is able to use "plug-and-play" (e/g)Node Bs, includes, in addition to Home (e/g)NodeBs (H(e/g)nodeBs), a home node B gateway, or HNB-GW (not shown in FIG. 1). A HNB Gateway (HNB-GW), which is typically installed within an operator's network may aggregate traffic from a large number of HNBs back to a core network.

Figure 2:
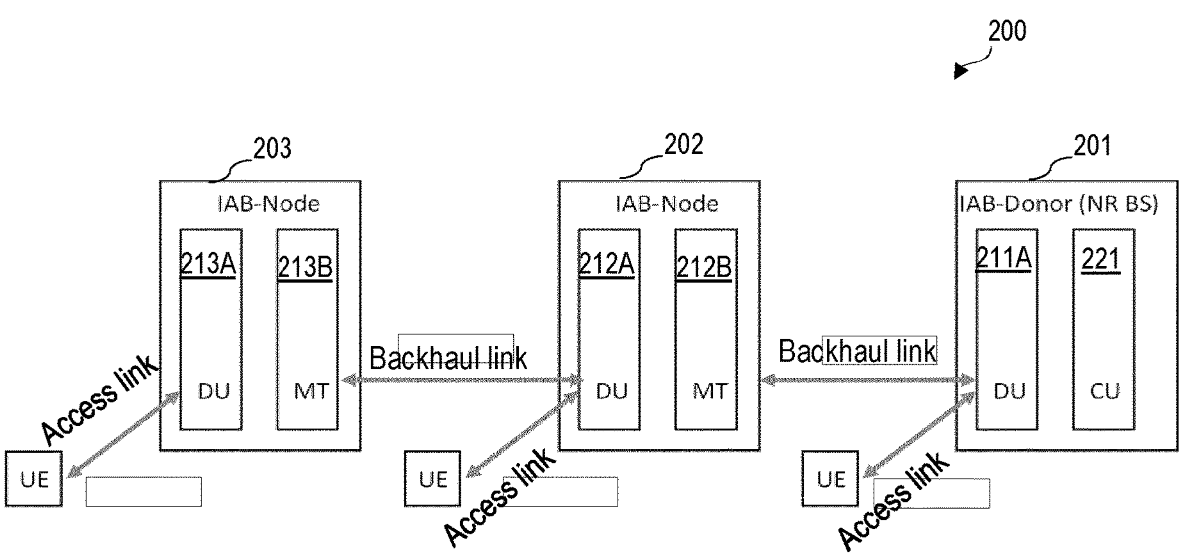
FIG. 2 is a schematic illustration of a communication system.

FIG. 2 is a schematic illustration of a wireless communication system 200. The communication system 200 may, for example, be configured to use a time division duplex (TDD) technique for data transmission.

Communication system 200 is shown to include a primary or IAB donor node 201 serving an IAB node 202 via a backhaul link, and the IAB node 202 then serving one or more UEs via an access link. The IAB donor 201 is equipped with a centralized unit (CU) 221 as well as a distributed unit (DU) 211A. The IAB node 202 is equipped with a DU 212A and a mobile termination (MT) unit 212B. The DU 212A and MT may be referred to as IAB-DU 212A and IAB-MT 212B respectively. The IAB node 202 may also have a backhaul interface with IAB-MT 213B of another IAB node 203. The IAB node 203 may serve one or more UEs via an access link. The IAB node 203 is further equipped with an IAB DU 213A. Each of the backhaul links and access links may be an air interface such as NR Uu interface. With this arrangement, data may, for example, pass in the downlink direction from the IAB donor node 201 to the IAB node 202 and in turn from the IAB node 202 to a served UE and to IAB node 203 etc., and data may likewise pass in the uplink direction from a served UE to the IAB node 202 and in turn to the IAB donor node.

Communication system 200 is shown to include one IAB donor node and two IAB nodes, for simplicity, but it is not limited.

Figure 3:
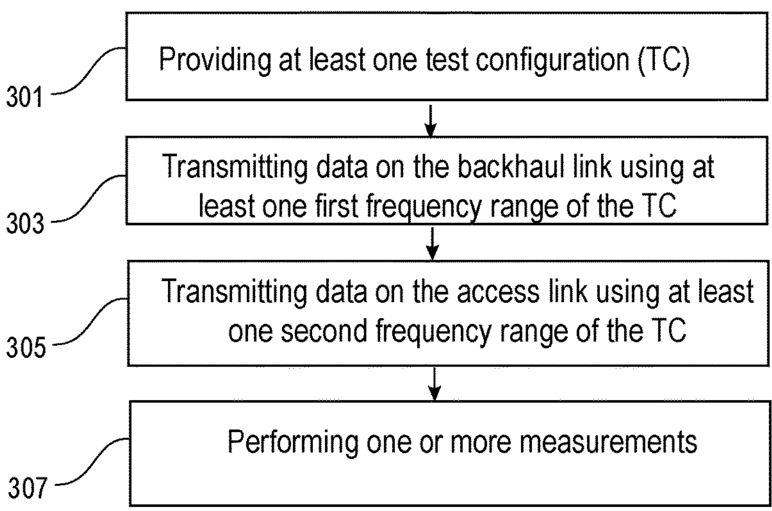
FIG. 3 is a flowchart of a method for operating an IAB node according to an example of the present subject matter.

FIG. 3 is a flowchart of a method for operating a node according to an example of the present subject matter. For the purpose of explanation, the method may be implemented in the system illustrated in previous FIGS. 1-2, but is not limited to this implementation. The node may, for example, be anyone of nodes 14 of FIG. 1 and IAB nodes 202 and 203 of FIG. 2.

At least one test configuration may be provided in step 301. The at least one test configuration may be used to perform a concurrent testing of the data transmission on the backhaul link of the node and on the access link of the node.

Data may be transmitted on the backhaul link using at least one first frequency range in step 303. Data may be transmitted on the access link using at least one second frequency range in step 305. The first and second frequency ranges may, for example, be defined as described with reference to FIGS. 4 and 5 e.g., the at least one first frequency range comprises two first frequency ranges which are the UL PRBs 401A and 401B respectively and the second frequency ranges comprises two second frequency ranges which are the DL PRBs 403A and 403B respectively.

In one example, steps 303 and 305 may be performed concurrently. In another example, 303 and 305 may be performed simultaneously. This may, for example, be enabled by using first time slots for transmitting data on the backhaul link and second time slots for transmitting data on the access link. The pattern of the first and second time slots may, for example, be provided as described with reference to FIG. 6.

One or more measurements may be performed in step 307 based on the data transmissions performed in step 303 and 305. Those measurements, for example, be provided e.g., to users as indications of test results. In another example, it may be checkered whether the measurements fulfill predefined test requirements. For example, if they fulfill the test requirements, this may indicate that the node may be used in real-life deployment. If they don't fulfill the test requirements, this may indicate that the node may not be used in real-life deployment.

Figure 4:
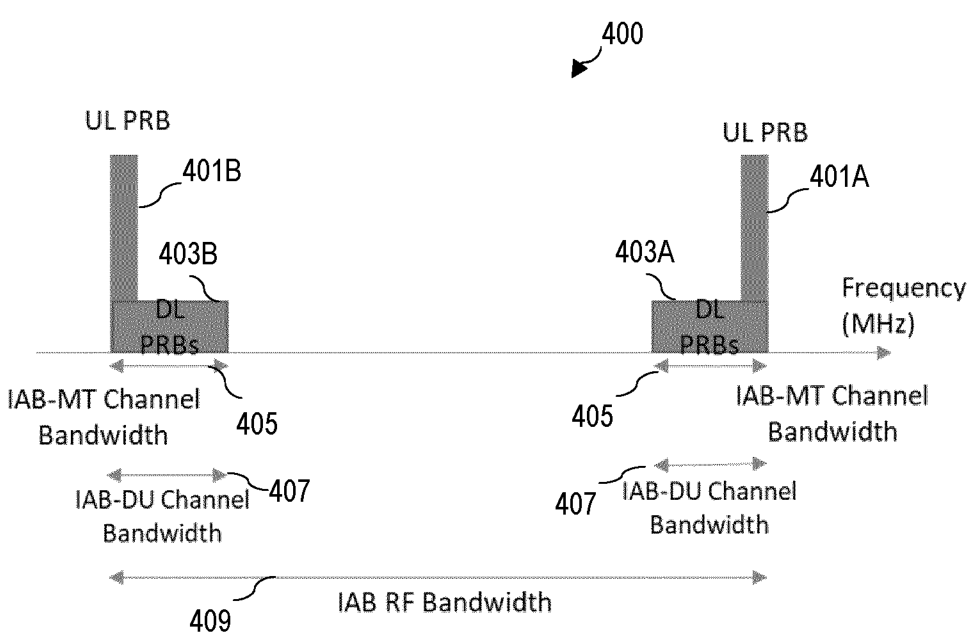
FIG. 4 is a diagram illustrating a test configuration for data transmission by an IAB node according to an example of the present subject matter.

FIG. 4 is a diagram illustrating a test configuration 400 for data transmission by an IAB node according to an example of the present subject matter.

From a TC perspective, the DL and UL transmission for the IAB-DU and IAB-MT may be done using completely shared or completely separate radio hardware, or an integration in between these 2 options. Placing both DL and UL transmission for IAB-DU and IAB-MT in the same TC (even though they may or may not be transmitted simultaneously) may represent a more demanding TC for the shared radio hardware, if any, for provision of the DL and UL transmission. Therefore, both DL and UL transmission for IAB-DU and IAB-MT are placed in the same TC. This is by contrast to an NR BS test methodology where only DL transmission is included in the TC and an NR UE test methodology where only UL transmission is included in the TC for conformance testing in TDD operating bands.

Moreover, it is anticipated that the Power Spectral Density (PSD) of the IAB-MT UL carrier(s) may be higher than the IAB-DU DL carriers, because fewer IAB-MT UL carrier (s) may be supported by the IAB than IAB-DU DL carriers, the channel bandwidth of the IAB-MT UL carrier(s) may be narrower than the channel bandwidth of the IAB-DU carriers, and there may be only single RB transmission in the IAB-MT UL carrier(s) while there may be full RB transmission in the IAB-DU DL carriers. And a higher PSD carrier at the edge of the IAB RF Bandwidth in the TC may represent more demanding TC for emission tests (e.g., operating band unwanted emissions), as the RF transmit filter design may need to provide a steeper roll-off to meet the emission requirements adjacent to the RF bandwidth edge. Therefore, the IAB TC may be defined with the IAB-MT UL carrier(s) placed as the outermost carrier at one or both edges the IAB RF bandwidth.

On example TC is shown in FIG. 4. At least one IAB-MT UL PRB 401A is placed within IAB-MT Channel Bandwidth 405 and at least one IAB-DU DL PRB 403A is placed within IAB-DU Channel Bandwidth 407 at one edge of the IAB RF bandwidth 409, while at least one IAB-MT UL PRB 401B is placed within IAB-MT Channel Bandwidth 405 and at least one IAB-DU DL PRB 403B is placed within IAB-DU Channel Bandwidth 407 at other edge of the IAB RF bandwidth 409. The DL and UL transmission for IAB-DU and IAB-MT may be done using the same frequency range but in different time slots (i.e., TDM mode) and/or beams (SDM mode). When the DL and UL transmission for IAB-DU and IAB-MT is done in SDM mode (i.e., using different directional beams), the DL and UL directional beams may be pointed as close as possible within the DL and UL beam direction ranges supported by the IAB-DU and IAB-MT, for example by requiring that the difference (e.g., angle difference) between the beam directions does not exceed the maximum difference. Note that the IAB-MT Channel Bandwidth 405 and IAB-DU Channel Bandwidth 407 may be equal or different, the UL PRB (401A or 401B) at one edge may be absent if the IAB-MT only supports one carrier, and there may be additional IAB-MT UL PRB(s) and IAB-MT DL PRB(s) in the middle of the IAB RF Bandwidth 409.

Figure 5:
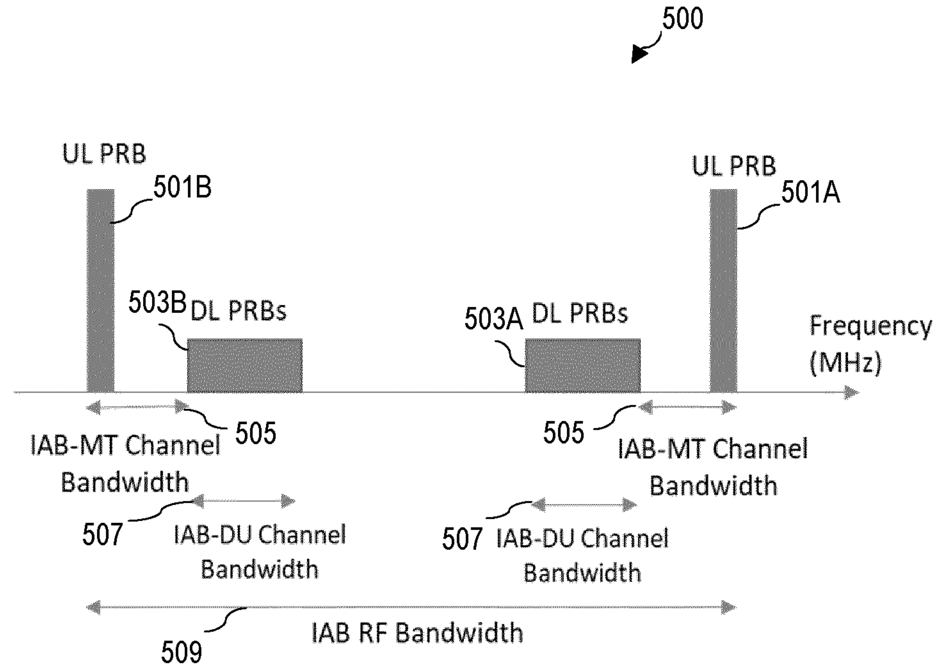
FIG. 5 is a diagram illustrating a test configuration for data transmission by an IAB node according to an example of the present subject matter.

FIG. 5 is a diagram illustrating a test configuration 500 for data transmission by an IAB node according to an example of the present subject matter;

As shown in FIG. 5, least one IAB-MT UL PRB 501A is placed within IAB-MT Channel Bandwidth 505 at one edge of the IAB RF bandwidth 509 next to at least one IAB-DU DL PRB 503A within IAB-DU Channel Bandwidth 507, while at least one IAB-MT UL PRB 501B is placed within IAB-MT Channel Bandwidth 505 at other edge of the IAB RF bandwidth 509 next to at least one IAB-DU DL PRB 503B within IAB-DU Channel Bandwidth 507. According to this example, the DL and UL transmission for IAB-DU and IAB-MT may be done using different frequency ranges (i.e., FDM mode). Note that the IAB-MT Channel Bandwidth 505 and IAB-DU Channel Bandwidth 507 may be equal or different, the UL PRB at one edge (501A or 501B) may be absent if the IAB-MT only supports one carrier, and there may be additional IAB-MT UL PRB(s) and IAB-MT DL PRB(s) in the middle of the IAB RF Bandwidth 509.

FIG. 6 are tables showing time slot configurations in accordance with an example of the present subject matter. The table 600 of FIG. 6 may provide configurations of TDD for IAB test models for Frequency Range 1 (FR1) of 5G and the table 602 may provide configurations of TDD for IAB test models for FR2 of 5G.

The tables 600 and 602 comprise example values of parameters that can be used to define time slot patters for the concurrent or simultaneous transmissions of the data on the backhaul link and access link of the IAB node. The parameters may, for example, be the following information elements defined for 5G: referenceSubcarrierSpacing, dl-UL-TransmissionPeriodicity, nrofDownlinkSlots, nrofDownlinkSymbols, nrofUplinkSlots, and nrofUplinkSymbols. referenceSubcarrierSpacing may be the subcarrier spacing. dl-UL-TransmissionPeriodicity may be the periodicity of the DL-UL pattern. nrofDownlinkSlots may be the number of consecutive full DL slots at the beginning of each DL-UL pattern. nrofDownlinkSymbols may be the number of consecutive DL symbols in the beginning of the slot following the last full DL slot. nrofUplinkSlots may be the number of consecutive full UL slots at the end of each DL-UL pattern. nrofUplinkSymbols may be the number of consecutive UL symbols in the end of the slot preceding the first full UL slot.

Values in each of the tables 600 and 602 enable TDD uplink/downlink configurations that have an around 1-to-1 UL/DL ratio for IAB-DU and IAB-MT conformance testing, so that there may be fair measurement time slots provisioned for IAB-DU and IAB-MT during the tests. This is by contrast to other test models such as in FR1 TDD operating bands that use TDD uplink/downlink configurations that have an around 1-to-3 UL/DL ratio.

In FIG. 7, a block circuit diagram illustrating a configuration of an apparatus 1070 is shown, which is configured to implement at least part of the present subject matter.

It is to be noted that the apparatus 1070 shown in FIG. 7 may comprise several further elements or functions besides those described herein below, which are omitted herein for the sake of simplicity as they are not essential for the understanding. Furthermore, the apparatus may be also another device having a similar function, such as a chipset, a chip, a module etc., which can also be part of an apparatus or attached as a separate element to the apparatus 1070, or the like. The apparatus 1070 may comprise a processing function or processor 1071, such as a central processing unit (CPU) or the like, which executes instructions given by programs or the like related to a flow control mechanism. The processor 1071 may comprise one or more processing portions dedicated to specific processing as described below, or the processing may be run in a single processor. Portions for executing such specific processing may be also provided as discrete elements or within one or more further processors or processing portions, such as in one physical processor like a CPU or in several physical entities, for example. Reference sign 1072 denotes transceiver or input/output (I/O) units (interfaces) connected to the processor 1071. The I/O units 1072 may be used for communicating with one or more other network elements, entities, terminals or the like. The I/O units 1072 may be a combined unit comprising communication equipment towards several network elements or may comprise a distributed structure with a plurality of different interfaces for different network elements. Reference sign 1073 denotes a memory usable, for example, for storing data and programs to be executed by the processor 1071 and/or as a working storage of the processor 1071.

The processor 1071 is configured to execute processing related to the above described subject matter. In particular, the apparatus 1070 may be configured to perform at least part of the method as described in connection with FIG. 3.

For example, the processor 1071 is configured for: using at least one test configuration for concurrently testing data transmission on a backhaul link and an access link of the IAB node.

As will be appreciated by person skilled in art, aspects of the present invention may be embodied as an apparatus, method, computer program or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer executable code embodied thereon. A computer program comprises the computer executable code or "program instructions".

Any combination of one or more computer readable medium(s) may be utilized. The computer readable medium may be a computer readable storage medium. A 'computer-readable storage medium' as used herein encompasses any tangible storage medium which may store instructions which are executable by a processor of a computing device. The computer-readable storage medium may be referred to as a computer-readable non-transitory storage medium. The computer-readable storage medium may also be referred to as a tangible computer readable medium. In some embodiments, a computer-readable storage medium may also be able to store data which is able to be accessed by the processor of the computing device.

'Computer memory' or 'memory' is an example of a computer-readable storage medium. Computer memory is any memory which is directly accessible to a processor. 'Computer storage' or 'storage' is a further example of a computer-readable storage medium. Computer storage is any non-volatile computer-readable storage medium. In some embodiments computer storage may also be computer memory or vice versa.

A 'processor' as used herein encompasses an electronic component which is able to execute a program or machine executable instruction or computer executable code. References to the computing device comprising "a processor" should be interpreted as possibly containing more than one processor or processing core. The processor may for instance be a multi-core processor. A processor may also refer to a collection of processors within a single computer system or distributed amongst multiple computer systems. The term computing device should also be interpreted to possibly refer to a collection or network of computing devices each comprising a processor or processors. The computer executable code may be executed by multiple processors that may be within the same computing device or which may even be distributed across multiple computing devices.

Computer executable code may comprise machine executable instructions or a program which causes a processor to perform an aspect of the present invention. Computer executable code for carrying out operations for aspects of the present invention may be written in any combination of one or more programming languages, including an object oriented programming language such as Java, Smalltalk, C++ or the like and conventional procedural programming languages, such as the "C" programming language or similar programming languages and compiled into machine executable instructions. In some instances the computer executable code may be in the form of a high level language or in a pre-compiled form and be used in conjunction with an interpreter which generates the machine executable instructions on the fly.

Generally, the program instructions can be executed on one processor or on several processors. In the case of multiple processors, they can be distributed over several different entities. Each processor could execute a portion of the instructions intended for that entity. Thus, when referring to a system or process involving multiple entities, the computer program or program instructions are understood to be adapted to be executed by a processor associated or related to the respective entity.

The invention claimed is:

1. A method for operating an integrated access and backhaul (IAB) node of a communication system, the method comprising:

using at least one test configuration for concurrently testing data transmission on a backhaul link and an access link of the IAB node, comprising:

concurrently testing the data transmission on the backhaul link and the access link of the IAB node at least by concurrently transmitting data on the backhaul link using at least one first frequency range and transmitting data on the access link using at least one second frequency range, wherein the first frequency range is a subrange of the second frequency range; and testing the data transmission at least by performing at least one measurement and determining whether results of the at least one measurement fulfil predefined test requirements.

2. The method of claim 1, wherein the at least one second frequency range is separated from the at least one first frequency range by a predefined frequency offset; or wherein the at least one second frequency range is equal to the at least one first frequency range respectively.

3. The method of claim 1, wherein the at least one first frequency range comprises one or two first frequency ranges, wherein each frequency range of the at least one first frequency range is placed at a respective difference edge of a radio frequency bandwidth of the IAB node.

4. The method of claim 1, wherein the data transmission on the backhaul link and the data transmission on the access link are performed on same time slots using beams having respective different beam directions in a spatial domain of the communication system.

5. The method of claim 4, wherein the different beam directions of the data transmission on the backhaul link and the data transmission on the access link are configured such that a difference between the different beam directions does not exceed a maximum difference.

6. The method of claim 1, wherein the data transmission on the backhaul link is performed in first time slots and the data transmission on the access link is performed in second time slots, wherein the first time slots and the second time slots are different.

7. A non-transitory computer program product comprising instructions, which when executed by at least one processor of an integrated access and backhaul (IAB) node, cause the integrated access and backhaul (IAB) node to perform at least the following:

using at least one test configuration for concurrently testing data transmission on a backhaul link and an access link of the IAB node, comprising:

concurrently testing the data transmission on the backhaul link and the access link of the IAB node at least by concurrently transmitting data on the backhaul link using at least one first frequency range and transmitting data on the access link using at least one second frequency range, wherein the at least one first frequency range is a subrange of the at least one second frequency range; and testing the data transmission at least by performing at least one measurement and determining whether results of the at least one measurement fulfil predefined test requirements.

8. An integrated access and backhaul (IAB) node, comprising:

at least one processor; and at least one memory storing instructions that, when executed by the at least one processor, cause the IAB node to perform at least the following:

using at least one test configuration for concurrently testing data transmission on a backhaul link and an access link of the IAB node, comprising:

concurrently testing the data transmission on the backhaul link and the access link of the IAB node at least by concurrently transmitting data on the backhaul link using at least one first frequency range and transmitting data on the access link using at least one second frequency range, wherein the at least one first frequency range is a subrange of the at least one second frequency range; and testing the data transmission at least by performing at least one measurement and determining whether results of the at least one measurement fulfil predefined test requirements.

9. The IAB node of claim 8, wherein the at least one second frequency range is separated from the at least one first frequency range by a predefined frequency offset.

10. The IAB node of claim 8, wherein the at least one first frequency range comprises one or two first frequency ranges, wherein each frequency range of the at least one first frequency range is placed at a respective difference edge of a radio frequency (RF) bandwidth of the IAB node.

11. The IAB node of claim 8, wherein the data transmission on the backhaul link and the data transmission on the access link are performed on same time slots using beams having respective different beam directions in a spatial domain.

12. The IAB node of claim 11, wherein the different beam directions of the data transmission on the backhaul link and the data transmission on the access link are configured such that a difference between the different beam directions does not exceed a maximum difference.

13. The IAB node of claim 8, wherein the data transmission on the backhaul link is performed in first time slots and the data transmission on the access link is performed in second time slots, wherein the first time slots and the second time slots are different.

14. The IAB node of claim 13, wherein a difference between a number of the first time slots and a number of the second time slots is smaller than a threshold.

15. The IAB node of claim 13, wherein a ratio of a number of the first time slots by a number of the second time slots is equal to one or substantially equal to one.

16. The IAB node of claim 13, wherein at least one memory stores instructions that, when executed by the at least one processor, cause the IAB node to perform at least the following: using the first time slots for data reception on the access link; and using the second time slots for data reception on the backhaul link.

17. The IAB node of claim 13, wherein the first time slots being uplink (UL) slots and the second time slots being downlink (DL) slots, wherein the uplink slots and the downlink slots are defined in accordance with a DL-UL pattern having a predefined periodicity.

18. The IAB node of claim 8, wherein the at least one second frequency range is equal to the at least one first frequency range respectively.

19. The IAB node of claim 8, wherein the at least one measurement comprises one or more of measurement of throughput or measurement of output power.

* * * * *